United States Patent [19]

Payne

[11] Patent Number: 4,483,765

[45] Date of Patent: Nov. 20, 1984

[54] OIL-DISPERSIBLE ANTIMONY OXIDE SOL DISPERSED AS AN OIL IN WATER EMULSION INTO A CRACKING FEED

[75] Inventor: Charles C. Payne, Aurora, Ill.

[73] Assignee: Nalco Chemical Company, Oak Brook, Ill.

[21] Appl. No.: 508,370

[22] Filed: Jun. 27, 1983

[51] Int. Cl.³ .................. C10G 11/05; B01J 29/38; B01J 13/00

[52] U.S. Cl. .................. 208/120; 208/52 CT; 252/313.1; 502/31; 502/521

[58] Field of Search .................. 502/25, 26, 31, 173, 502/521; 208/52 CT, 120

[56] References Cited

U.S. PATENT DOCUMENTS 4,022,710  5/1977  Kobashi et al. .................. 252/313 R
4,036,740  7/1977  Readel et al. .................. 208/120

*Primary Examiner*—P. E. Konopka
*Attorney, Agent, or Firm*—John G. Premo; Robert A. Miller; Donald G. Epple

[57] ABSTRACT

It is now known that molecular sieve cracking catalysts used in fluid catalytic cracking units which have been contaminated with such metals as vanadium and nickel can be restored by contacting such contaminated catalysts with antimony-containing compounds and then subsequently subjecting the thus-treated catalysts to elevated temperatures and an oxygen-containing gas whereby revitalization is achieved.

The above process can be improved by using as a source of antimony oxide an oil-in-water emulsion of an aqueous antimony sol.

1 Claim, No Drawings

OIL-DISPERSIBLE ANTIMONY OXIDE SOL DISPERSED AS AN OIL IN WATER EMULSION INTO A CRACKING FEED

INTRODUCTION

It is now known that molecular sieve cracking catalysts which have been contaminated with such metals as vanadium and nickel can be restored by contacting these contaminated catalysts with antimony-containing compounds and then subsequently subjecting the thus-treated catalysts to elevated temperatures and an oxygen-containing gas whereby revitalization is achieved.

This technology is described in U.S. Pat. No. 3,711,422, the disclosure of which is incorporated herein by reference.

In commercial practice, the antimony compound is usually in the form of an organo metallic antimony compound which is oil-soluble. These compounds are then fed via a slip stream to the liquid hydrocarbon feed going to the cracking catalyst. Under the conditions of regeneration, the organo metallic antimony compound decomposes to antimony oxide.

In an effort to reduce the costs of this rejuvenation process, attempts have been made to use antimony oxide powders or antimony oxide aqueous sols to provide a more cost effective source of antimony for treating the contaminated catalysts. These efforts have not been too successful since these hydrophilic forms of antimony are incompatible with the liquid hydrocarbon streams and, therefore, when used, do not provide a uniform treatment of the contaminated catalysts.

If it were possible to utilize inexpensive forms of antimony oxide, particularly antimony sols, whereby they could be uniformly admixed with the hydrocarbon liquid feed streams being fed to contaminated molecular sieve cracking catalysts, an improvement in the art would be afforded.

THE INVENTION

I have found that antimony sols can be used as a source of antimony oxide to treat metal contaminated cracking catalysts in a process of the type described in U.S. Pat. No. 3,711,422 by dispersing these sols in the form of an oil-in-water emulsion into the hydrocarbon feed stream fed to the contaminated catalysts.

In a preferred embodiment of the invention, the antimony sol is first prepared in the form of an oil-in-water emulsion, which emulsion contains from 1-50% of antimony oxide expressed as $Sb_2O_5$. Also contained in these emulsions is an oil-in-water emulsifying agent. In a most preferred embodiment of the invention, the emulsifying agent is a fatty substituted quaternary ammonium salt or hydroxide exemplified by the compound, dimethyl dicoco ammonium chloride.

THE ANTIMONY SOLS

These materials are well known and may be prepared using a number of well known techniques. One method for preparing an antimony trioxide sol is described in U.S. Pat. No. 3,676,362 in which an antimony trichloride is dissolved in an organic solution, treated with $NH_4OH$ to produce $NH_4Cl$ and antimony trioxide. The $NH_4Cl$ is removed and the antimony trioxide is present as a sol in the solution.

Another prior art method of preparing the antimony pentoxide sol is described in U.S. Pat. No. 3,860,523. In this procedure a solution of potassium antimonate (containing 2% by weight of antimony calculated as $Sb_2O_5$) is passed through a hydrogen form cation exchange resin whereby the potassium ions are exchanged for hydrogen ions to yield a pentavalent antimony oxide sol. The low concentration of antimony pentoxide obtained by this process requires an evaporation step to obtain a high concentration of antimony.

Other prior art methods are described which show that antimony pentoxide may be formed from antimony trioxide by treating the antimony trioxide with HCl to form antimony trichloride which, in turn, is oxidized to antimony pentoxide by reacting the antimony trichloride with hydrogen peroxide to form hydrates of antimony pentoxide.

THE OIL-IN-WATER EMULSIFYING AGENTS

These materials are well known and have an HLB value of at least 8 and, preferably, within the range of 8-18. The HLB system for determining types of emulsifier is described in the publication, *The HLB System*, edited and reprinted from Chemmunique, publication of ICI Americas Inc., Wilmington, DE, 1976.

For use in the present invention, the emulsifying agents are characterized as being able to form an oil-in-water emulsion of the antimony oxide sol without causing destabilization of such sols. The amount of emulsifier used to produce these emulsions may range from as little as 0.1% up to as high as 8-10% by weight. A typical emulsifier level would be between 0.5-3% by weight. As indicated, a preferred class of emulsifying agents are the oil-soluble, fatty quaternary ammonium salts or hydroxides, specifically di- or mono-methyl, di- or tri-coco ammonium chloride. This compound has an HLB of 11.4.

THE HYDROCARBON LIQUID USED TO PRODUCE THE EMULSIONS

The hydrocarbon liquid is preferably a hydrocarbon liquid corresponding generally to the composition of the hydrocarbon stream being fed to the fluid catalytic cracking unit containing a molecular sieve cracking catalyst sought to be restored to higher activity level. Thus, light cycle oils, naphthas, and the like would be typical liquids used to prepare the antimony oxide sol emulsions.

A typical emulsion used in the practice of the invention would have the following composition:

| Ingredients | % by Weight |
| --- | --- |
| 12% $Sb_2O_5$ antimony sol | 76.67% |
| dimethyl dicoco ammonium chloride | 1.53% |
| Light Cycle Oil | 18.80% |
| | 100.00% |

The products of the invention can be added into any hydrocarbon liquid prior to being injected into a hydrocarbon stream going to a fluid catalytic cracking unit. The hydrocarbons can be a hydrocarbon liquid forming a side cut recycle slip stream going to the fluid catalytic cracking unit or other hydrocarbon liquids illustrated by, but not limited to, feed oils, gas oils, gasoline, diesel fuel oils, kerosenes or bottom recycle oils. The specific addition points, in addition to a direct side stream going to a fluid catalytic cracking unit, would be blend tanks on the fluid catalytic cracking unit. Other central pumping points in the refinery going to the fluid catalytic cracking unit can serve as an addition point for adding the antimony sol emulsions.

When emulsions of the type described above are added in the manner prescribed, the antimony particles contained in the sol are uniformly dispersed into the hydrocarbon liquid. It is believed that when the starting oil-in-water emulsions are added to large volumes of hydrocarbon liquids, that in all probability a phase inversion occurs and the antimony sol becomes dispersed in the feed stream, most probably in the form of a water-in-oil emulsion.

To illustrate the above phenomenon, when an emulsion of the type described above would be added to a large quantity of a light cycle oil with good mixing, the antimony contained in the starting emulsion would be uniformly dispersed in the light cycle oil.

Having thus described my invention, it is claimed as follows:

1. In a process wherein the activity of metal contaminated molecular sieve cracking catalysts contained in a fluid catalytic cracking unit are restored by treating these catalysts with an activity improving amount of antimony oxide which is added to a hydrocarbon stream fed to the fluid catalytic cracking unit and then heating the thus treated catalyst in the presence of a free oxygen containing gas to an elevated temperature whereby the activity of the catalyst is improved, the improvement which comprises using as the source of antimony oxide an oil-in-water emulsion of an aqueous antimony sol which has been uniformly dispersed into a hydrocarbon stream feed to the catalytic cracking unit.

* * * * *